Figure 1:
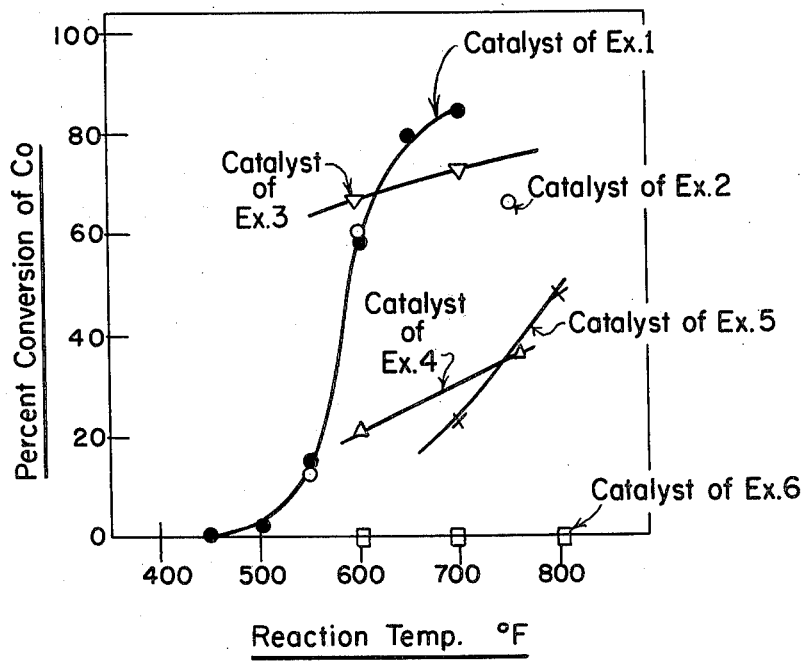

United States Patent Office 3,181,928
Patented May 4, 1965

3,181,928
PROCESS FOR PURIFYING GASES
Vincent J. Frilette, Erlton, N.J., and Paul B. Weisz, Media, Pa., assignors to Socony Mobil Oil Company, Inc., a corporation of New York
Filed Jan. 26, 1960, Ser. No. 4,797
2 Claims. (Cl. 23—2)

This invention relates to a process for catalytically oxidizing carbon compounds in the presence of a unique catalyst. More particularly, the present invention is concerned with a method wherein a carbon compound undergoes oxidation in the presence of a catalyst consisting essentially of particular crystalline aluminosilicate salts.

Heterogeneous catalysis of oxidation inolving reaction of carbon or carbon compounds with molecular oxygen has heretofore been effected in the presence of a great variety of solids. Thus, the ability of a large number of metals and metal oxides either alone or in combination, to catalyze oxidation reactions has been recognized. The following metals or their oxides, have for example, been mentioned as components of oxidation catalysts: cerium, chromium, cobalt, iridium, copper, iron, lead, manganese, ruthenium, silver, tin, thorium, titanium, tungsten, vanadium, zinc and zirconium. Metals or compounds of metals of the transition series, including, for example, the metals of Group VIA, VIIA, and Group VIII have been widely used as components of oxidation catalyst composition. Silver has been used as a relatively mild catalyst for oxidation of low molecular weight olefins, such as ethylene. The above catalytically active metals or metal compounds have generally been deposited upon porous carriers or supports. Several catalysts previously proposed for the oxidation of carbon compounds, for example, consist of a porous inorganic oxide gel, or a porous refractory substance such as asbestos, impregnated with a catalytically active metal, such as platinum or silver.

While many of the above prior oxidation catalysts perform successfully under relatively mild operating conditions or in rather specific applications under carefully controlled conditions, such catalysts very often have been unable to withstand extremely severe operating conditions over long periods of time, being susceptible to poisoning influences and poor physical stability.

It is accordingly an object of the present invention to provide a process for the catalytic oxidation of carbon compounds in the presence of a catalyst capable of preserving its physical stability and maintaining high activity under widely varying conditions of mechanical treatment and temperature. A further object is to provide an inexpensive catalyst for the above process which is highly resistant to contamination and metal poisoning, thereby permitting its use for the oxidation of a wide variety of carbon compounds. A still further object is the provision of a commercially attractive process for effecting catalytic oxidation of carbon monoxide and hydrocarbons.

The above and other objects which will be apparent to those skilled in the art are achieved in accordance with the process described herein. In accordance with the present invention, there is provided an oxidation process of the type defined, carried out in the presence of a catalyst which possesses the above described desirable attributes. Thus, the catalytic oxidation process of the invention permits applications which have, as a practical matter, not heretofore been feasible due to the lack of a suitable low cost oxidation catalyst. For example, the use of catalysts for oxidizing carbon monoxide and hydrocarbons to eliminate the same from exhaust fumes of internal combustion engines has been suggested many times in the past, but has not up to the present been commercially feasible because of the lack of a sufficiently active and durable oxidation catalyst.

In light of the prior art teachings that it was essential for a catalyst intended for use in the oxidation of carbon compounds to have as a component thereof a metal or oxide of a metal of the transition series, it has unexpectedly been discovered in accordance with the present invention that certain crystalline alkali and alkaline earth metal aluminosilicate salts are highly effective catalysts for effecting oxidation of carbon compounds. These crystalline aluminosilicate salts do not require further activation or impregnation with metals or metal compounds to impart catalytic oxidation activity thereto but may be used directly for promoting and effecting the catalytic oxidation of hydrocarbons and other carbon compounds.

In one embodiment of the present invention, it has been found that the crystalline alkali metal and alkaline earth metal aluminosilicate salts possess catalytic oxidation activities greater than those of certain conventional and heretofore widely employed metal composites. It has further been established that detoxification of gas streams by removal therefrom of carbon monoxide, through conversion to carbon dioxide and the removal of hydrocarbons from gaseous atmospheres may readily be effected in the presence of the specified crystalline aluminosilicate salts. It has further been found, as will be evident from data presented herein, that the catalytic oxidation activity possessed by the described crystalline aluminosilicate salts is distinct from that obtainable with amorphous gel composites of silica and alumina.

The charge of carbon compound undergoing oxidation in accordance with the present process may vary widely and include carbon monoxide, a sulfur-containing carbon compound, a nitrogen-containing carbon compound, an oxygen-containing carbon compound, a hydrocarbon or mixtures thereof. The hydrocarbon may be a paraffinic, olefinic, naphthenic, aromatic component or a mixture of two or more such components. Representative carbon compounds susceptible to catalytic oxidation under the conditions described herein include: carbon monoxide, propylene, isobutylene, n-heptane, methylcyclohexane, hexene-1,2-methyl-butene - 2, 3 - methylpentane, benzene methylcyclopentane, toluene, decalin, naphthalene; as well as thiophenes, pyridines, mercaptans, alcohols, ethers, aldehydes, and other organic compounds.

The catalyst utilized in the present process consists essentially of specified crystalline alkali or alkaline earth metal aluminosilicate salts. Such salts are essentially dehydrated forms of crystalline zeolites, in which the atoms of alkali or alkaline earth metal, silicon, aluminum and oxygen are arranged in a definite and consistent crystalline pattern. The structure contains a large number of small cavities, interconnected by a number of still smaller channels. These cavities and channels are precisely uniform in size. Chemically, these zeolites may be represented by the general formula:

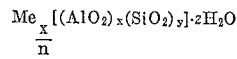

where Me is an alkali or alkaline earth metal cation, $x/n$ is the number of exchangeable metal cations of valence, $n$, $x$ is also the number of aluminum ions combined in the form of aluminate, $y$ is the number of silicon atoms and $z$ is the number of water molecules, removal of which produces the characteristic channel system. In the above formula, the ratio $y/x$ is a number from 1 to 5 and usually from 1 to 2. Zeolites having the above characteristics have sometimes been referred to as molecular sieves. At the present time, there are commercially available molecular sieves of the "A" series and of the "X" series. A synthetic zeolite known as "Molecular Sieve 4A" is a crystalline sodium aluminosilicate having an effective pore diameter of about 4 angstroms. In the hydrated form, this material is chemically characterized by the formula: $Na_{12}(AlO_2)_{12}(SiO_2)_{12} \cdot 27H_2O$. The synthetic zeolite known as "Molecular Sieve 5A" is a crystalline aluminosilicate salt having an effective pore diameter of about 5 angstroms and in which substantially all of the 12 ions of sodium in the immediately above formula are replaced by calcium, it being understood that calcium replaces sodium in the ratio of one calcium ion for two sodium ions. A crystalline sodium aluminosilicate is also available commercially under the name of "Molecular Sieve 13X." The letter "X" is used to distinguish the inter-atomic structure of this zeolite from that of the "A" crystal mentioned above. As prepared, the 13X material contains water and has the unit cell formula $$Na_{86}[(AlO_2)_{86}(SiO_2)_{106}] \cdot 267H_2O$$

The parent zeolite is dehydrated to make the active catalyst. The synthetic zeolite know as "Molecular Sieve 10X" is a crystalline aluminosilicate salt in which a substantial proportion of the sodium ions of the 13X material have been replaced by calcuim.

Molecular sieves of the "A" series consist fundamentally of a three-dimensional structure of tetrahedral silicon and aluminum. These tetrahedra are joined by sharing oxygen atoms in such a manner that the ratio of atoms of oxygen to the total number of atoms of aluminum and silicon is equal to two. The electrovalence of the tetrahedra containing aluminum is balanced by the inclusion in the crystal of a cation, for example, an alkali metal or an alkaline earth metal cation. This equilibrium can be expressed by formula wherein the ratio of $Al_2$ to the number of the various cations, such as $Ca$, $Sr$, $Na_2$, $K_2$ or $Li_2$ is equal to unity. One cation may be exchanged either in entirety or partially by another cation utilizing ion exchange techniques as discussed hereinbelow. The spaces between the tetrahedra are occupied by molecules of water prior to dehydration.

Molecular sieves are ordinarily prepared initially in the sodium form of the crystal. The sodium ions in such form may, as desired, be exchanged for other alkali or alkaline earth metal cations. In general, the process of preparation involves heating, in aqueous solution, an appropriate mixture of oxides, or of materials whose chemical composition can be completely represented as a mixture of oxides $Na_2O$, $Al_2O_3$, $SiO_2$ and $H_2O$ at a temperature of approximately 100° C. for periods of 15 minutes to 90 hours or more. The product which crystallizes within this hot mixture is separated therefrom and water washed until the water in equilibrium with the zeolite has a pH in the range of 9 to 12. After activating by heating until dehydration is attained, the substance is ready for use.

The empirical formula for the zeolites utilized herein can be expressed as:

$$\frac{M_2}{n}O \cdot Al_2O_3 \cdot XSiO_2 \cdot YH_2O$$

where M is an alkali or alkaline earth metal or combination thereof and $n$ is the balance of the metal. A specific crystalline zeolite has values of X and Y within a definite range. The value of X for any specific zeolite varies in a certain manner depending on whether aluminum or silicon atoms occupy equivalent positions in the lattice. For molecular sieves of the "A" series, X has an average value of $1.85 \pm 0.5$. The value of Y, depending on the condition of hydration and on the metal cation present may vary from 6 to 0. The average value of Y for the completely hydrated sodium zeolite of the "A" series is 5.1. In the above general formula, the ratio of $Na_2O$ to $Al_2O_3$ is equal to 1. However, if during the process of preparation, excess of the base present in the mother liquor is not eliminated by washing of the crystalline precipitate, analysis will show a ratio slightly greater than 1. On the other hand, if the washing is excessive a certain amount of exchange of the sodium ions may occur bringing the aforementioned ratio to slightly less than 1. The ratio of $$\frac{M_2}{n}O \text{ to } Al_2O_3$$

in the above general formula may accordingly be defined more accurately as being $1 \pm 0.2$ Suitable reagents in the preparation of the sodium zeolite of the "A" series include silica gel, silicic acid or sodium silicate as sources of silica. Alumina can be supplied by utilizing activated alumina, gamma alumina, alpha alumina, aluminum trihydrate or sodium aluminate. Sodium hydroxide is suitably used as the source of the sodium ion and in addition contributes to the regulation of the pH. All reagents are preferably soluble in water. The reaction solution has a composition, expressed as mixtures of oxides, within the ranges $SiO_2/Al_2O_3$ of 0.5 to 2.5, $Na_2O/SiO_2$ of 0.8 to 3.0 and $H_2O/Na_2O$ of 35 to 200. The reaction mixture is placed in a suitable vessel which is closed to the atmosphere in order to avoid losses of water and the reagents are then heated for an appropriate length of time. A convenient and generally employed process of preparation involves preparing an aqueous solution of sodium aluminate and sodium hydroxide and then adding with stirring an aqueous solution of sodium silicate. It is to be noted that the material first formed on mixing the above solutions is an amorphous precipitate generally catalytically inactive in the process of the invention. It is only after transformation of the amorphous precipitate to a crystalline form that the highly active catalyst described herein is obtained. While satisfactory crystallization may be obtained at temperatures from 21° C. to 150° C., the pressure being atmospheric or less, corresponding to the equilibrium of the vapor pressure with the mixture at the reaction temperature, crystallization is ordinarily carried out at about 100° C. For temperatures between room temperature (21° C.) and 150° C. an increase in temperature increases the velocity of the reaction and decreases its duration. As soon as the zeolite crystals are completely formed, they retain their structure and it is not essential to maintain the temperature of the reaction any longer in order to obtain a maximum yield of crystals.

After formation, the crystalline zeolite is separated from the mother liquor, usually by filtration. The crystalline mass is then washed, preferably with distilled water, and while on the filter, until the wash water, in equilibrium with the zeolite, reaches a pH of 9 to 12. The crystals are then dried at a temperature between 25° C. and 150° C. Activation is attained upon dehydration. The resulting crystalline zeolite has rigid three-dimensional networks made up of unit cells characterized by the substantial absence of change in unit cell dimensions upon dehydration and rehydration. The catalytically active aluminosilicate salt employed in the process of the present invention is further necessarily characterized by pores of uniform dimensions distributed throughout the crystalline structure. In this regard, molecular sieves of calcium and/or sodium aluminosilicate which possess a uniform effective pore diameter within the approximate range of 3 to 15 Angstrom units have been found to be particularly applicable.

The sodium ions of the above zeolite may thus be replaced partially or completely by other alkali metal or by alkaline earth metal cations. Replacement is suitably accomplished by contacting the crystalline sodium aluminosilicate zeolite with a solution of an ionizable compound of the alkali metal or alkaline earth metal ion which is to be zeolitically introduced into the molecular sieve structure for a sufficient time to bring about the extent of desired introduction of such ion. After such treatment, the resulting exchanged product is water-washed and dried and thereafter is ready for use. The extent to which exchange takes place can be controlled. Thus, taking the exchange of sodium for calcium as a typical example, such exchange can be effected in a proportion of less than 5 percent up to 100 percent. One method of regulation of the degree of exchange consists of impregnating a known amount of the sodium zeolite with solutions containing determined amounts of exchangeable ions.

As noted hereinabove, there are numerous forms of zeolites of the "A" series having exchanged ions. While, generally, the substances containing a divalent alkaline earth metal have pore size characteristics analogous to those of calcium, the exact pore size will differ. Such property can be advantageously employed in the process of the present invention in affording control of pore size by suitable selection of a particular cation. Similarly, the substances having a monovalent alkali metal ion have pore size characteristics similar to the sodium zeolite of such series, but the precise pore size is subject to similar control and selection.

Molecular sieves of the "X" series are characterized by the formula:

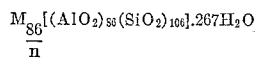

where M is Na+ or Ca++ or other alkali metal or alkaline earth metal ions introduced by replacement thereof and $n$ is the valence of the cation M. The structure consists of a complex assembly of 192 tetrahedra in a large cubic unit cell 24.95 A. on an edge. The adsorption volume is about 0.35 cc./gram of dehydrated zeolite.

For molecular sieves of this series, in the empirical formula:

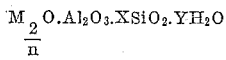

X has an average values of $2.5 \pm 0.5$. The value of Y, depending on the condition of hydration and on the metal cation present may vary from 8 to 0. The average value of Y for the completely hydrated sodium zeolite of the "X" series is 6.2.

Molecular sieves of the "X" series are prepared in a manner similar to that described hereinabove for preparation of molecular sieves of the "A" series. However, for synthesis of the "X" series molecular sieves, the reaction mixture has a composition, expressed as mixtures of oxides, within the following limits: $SiO_2/Al_2O_3$ of 3 to 5, $Na_2O/SiO_2$ of 1.2 to 1.5 and $H_2O/Na_2O$ of 35 to 60.

The catalyst of aluminosilicate employed in the present process is preferably used in the form of small fragments of a size best suited for operation under the specific conditions existing. Thus, the catalyst may be in the form of a finely divided powder or may be in the form of pellets of $\frac{1}{16}''$ to $\frac{1}{8}''$ size, for example, obtained upon pelleting the crystalline aluminosilicate with a suitable binder such as clay. The commercially available material, described hereinabove, may be obtained on a clay-free basis or in the form of pellets in which clay is present as a binder.

It has been found, in accordance with the present invention, that carbon compounds can be effectively oxidized, in a direct manner by bringing the same, in the presence of an atmosphere containing free oxygen, such as air into contact with the crystalline aluminosilicate catalyst having pores sufficiently large to permit entry therein of the carbon compound reactant and removal therefrom of the oxidation product and subsequently separating the product formed upon catalytic oxidation of the carbon compound from the catalyst. The charge of carbon compound may be contacted with the catalyst at temperatures within the approximate range of 200 to 1500° F. The process may be carried out on a batch basis or may be conducted continuously by passing the charge of carbon compound and oxygen-containing gas simultaneously over the catalyst under conditions such that the mol ratio of oxygen to carbon compound is within the approximate range of .1:1 to 50:1.

The following examples will serve to illustrate the method of the invention without limiting the same:

EXAMPLES 1–6

The oxidation of carbon monoxide to carbon dioxide was carried out by passing an air stream containing 1 percent by volume of carbon monoxide at 100 cc./minute over 100 to 200 milligrams of catalyst contained in a Vycor tube passing through a furnace. The effluent gas was passed through a barium hydroxide-carbon dioxide detection cell, then over a chromia-alumina catalyst (containing 33 weight percent $Cr_2O_3$ and 67 weight percent $Al_2O_3$) at 1300° F. to oxidize any remaining carbon monoxide and through a second carbon dioxide detection cell. The amount of carbon dioxide absorbed by each cell was plotted against time. The slopes of the two recorded lines are proportional to the rate of $CO_2$ production and remaining CO concentration, respectively, and allow the determination of CO conversion over the catalyst.

Conversion data were obtained at various temperatures between 400° F. and 800° F., utilizing respectively as catalysts sodium aluminosilicate having a uniform structure made up of pores having an effective diameter of about 13 Angstrom units (Molecular Sieve 13X); sodium aluminosilicate having a uniform structure made up of pores having an effective diameter of about 4 Angstrom units (Molecular Sieve 4A); calcium aluminosilicate having a uniform structure made up of pores having an effective diameter of about 5 Angstrom units (Molecular Sieve 5A) and for comparison purposes conventional oxidation catalysts heretofore employed including a clay support having deposited thereon 18 weight percent of CuO; a cogel chromia-alumina composite containing approximately 33 weight percent $Cr_2O_3$ and 67 weight percent $Al_2O_3$; a cogel silica-alumina composite containing approximately 10 weight percent $Al_2O_3$ and 90 weight percent silica.

The results are set forth below in Table I for specified temperatures and more completely are shown graphically in FIGURE 1 wherein the percent conversion of carbon monoxide charged is plotted against reaction temperature for the various catalysts.

Table I

| Example | Catalyst | Temp., °F. | Percent Conversion of CO |
|---|---|---|---|
| 1 | 13X Molecular Sieve, 14–20 mesh | 600 | 57 |
| 2 | 4A Molecular Sieve, ⅛x⅛" pellets | 600 | 63 |
| 3 | 5A Molecular Sieve, ⅛x⅛" pellets | 600 | 60 |
| 4 | 18% CuO on clay, ⅛x⅛" pellets | 600 | 21 |
| 5 | $Cr_2O_3$—$Al_2O_2$ cogel, 14–20 mesh | 700 | 23 |
| 6 | $SiO_2$—$Al_2O_3$ cogel, 14–20 mesh | 600–800 | 0 |

It will be seen from the foregoing data that the percent conversion of carbon monoxide achieved with the aluminosilicate catalysts described herein (Examples 1–3) was very substantially greater under identical reaction conditions as compared with conventional oxidation catalysts.

EXAMPLE 7

Into a stream of air entering the apparatus described in the foregoing examples at a flow-rate of 100 cc./min. was injected 1.8 cc. of gaseous propylene. The amount of oxidation to carbon dioxide was determined by recording the total amount of $CO_2$ absorbed in the first cell and total $CO_2$ recorded in the first and second cell. Using as catalyst, 200 milligrams of sodium aluminosilicate having a uniform structure made up of pores having an effective diameter of about 4 Angstrom units (Molecular Sieve 4A), the conversion obtained was 18.5 percent. Without catalyst in the tube, no conversion was realized.

EXAMPLE 8

Into a stream of air entering the above described apparatus at a flow rate of 100 cc./min. was injected 1.8 cc. of isobutylene. The amount of oxidation to carbon dioxide was determined as in the preceding example, employing 200 milligrams of the same catalyst, i.e., Molecular Sieve 4A. The conversion obtained in this instance was 16 percent.

EXAMPLES 9–11

The oxidation of propylene to carbon dioxide was carried out, in the manner described above in Examples 1–6, but employing as feed, a continuous flow of 1 percent by volume of propylene in air. Conversion data were obtained at 800° F. utilizing respectively as catalysts 200 milligrams of Molecular Sieve 13X, Molecular Sieve 5A and Molecular Sieve 4A. The results obtained are shown below in Table II:

*Table II*

| Example | Catalyst | Percent Conversion to $CO_2$ |
| --- | --- | --- |
| 9 | 13X Molecular Sieve, 14–20 mesh | 25.1 |
| 10 | 5A Molecular Sieve, 1/8 x 1/8" pellets | 25.7 |
| 11 | 4A Molecular Sieve, 1/8 x 1/8" pellets | 21.8 |

EXAMPLES 12–17

In these examples, 20 cc. of sodium aluminosilicate having a uniform structure made up of pores having an effective diameter of 13 Angstrom units (Molecular Sieve 13X) were charged to a static reactor tube at atmospheric pressure and various hydrocarbons were charged with an air flow rate of 15 liters/hour employing a molar ratio of oxygen/hydrocarbon as indicated below. The inlet temperature was 350° F. The temperature rise was measured as an indication of resulting oxidation, as well as the amount of unrecovered liquid, to additionally indicate the degree of oxidation. The data obtained are summarized below in Table III.

*Table III*

| Example | Hydrocarbon Charge | Maximum Temp. at Outlet, °F. | Unrecovered Liquid, Percent | $O_2$/HC Molar Ratio |
| --- | --- | --- | --- | --- |
| 12 | n-Heptane | 736 | 20 | .9/1 |
| 13 | Methylcyclohexane | 962 | 66 | .9/1 |
| 14 | Hexene-1 | 976 | 65 | .9/1 |
| 15 | 2-methyl-butene-2 | 980 | 64 | .9/1 |
| 16 | 3-methyl-pentane | 913 | 17 | .9/1 |
| 17 | Benzene | [1] >1,000 | [2] | .6/1 |

[1] Inlet temperature of 550° F.
[2] Temperature rise due to rapid oxidation required shutdown of apparatus before liquid recovery could be obtained.

In order to compare with the above catalytic tests, thermal oxidation tests utilized as charged n-heptane in air, the molar ratio of oxygen to n-heptane being 0.9 and with no catalyst in the reactor tube were carried out. A negligible heat production for inlet temperatures of 400° F. (maximum observed rise of 10° F.) and of 660° F. (maximum observed rise of about 5° F.) resulted, indicating that no appreciable conversion was obtained in the absence of catalyst, even at a relatively high temperature.

The use of catalysts described herein in an oxidizing reaction zone will also induce other reactions. It will be obvious from an inspection of the results in Table III that much more hydrocarbon charge was degraded to low-boiling, and therefore unrecovered liquid, than can be converted by combustion to carbon dioxide. For example, it would require about nine mols of oxygen to burn 66 percent of the mol of methylcyclohexane charged, whereas a total of only 0.9 of a mol of oxygen were charged per mol of methylcyclohexane. This leads to the conclusion that extensive conversion takes place to low molecular weight products which do not contain combined oxygen.

It will be evident from the foregoing that the alkali metal and alkaline earth metal aluminosilicate salts employed in the present process as catalysts are applicable for effecting catalytic oxidation of a wide variety of carbon compounds. Accordingly, it is to be understood that the above description is merely illustrative of preferred embodiments of the invention, of which many variations may be made within the scope of the following claims by those skilled in the art without departing from the spirit thereof.

We claim:

1. A process for catalytically oxidizing carbon monoxide which comprises contacting the same at a temperature within the approximate range of 200 to 1500° F. with an atmosphere containing free oxygen in the presence of a catalyst of a solid porous crystalline aluminosilicate having rigid three-dimensional networks made up of unit cells characterized by the substantial absence of change in unit cell dimensions upon dehydration and rehydration and possessing a uniform effective pore diameter within the approximate range of 3 to 15 Angstrom units.

2. A process for catalytically oxidizing exhaust fumes from an internal combustion engine which comprises contacting the same at a temperature within the approximate range of 200 to 1500° F., with an atmosphere containing free oxygen in the presence of a catalyst of a solid porous crystalline aluminosilicate having rigid three-dimensional networks made up of unit cells characterized by the substantial absence of change in unit cell dimensions upon dehydration and rehydration and possessing a uniform effective pore diameter within the approximate range of 3 to 15 Angstrom units.

References Cited by the Examiner

UNITED STATES PATENTS

| | | | |
| --- | --- | --- | --- |
| 1,694,122 | 12/28 | Jaeger | 260—687 |
| 2,900,430 | 8/59 | Henke et al. | 260—676 |
| 2,908,639 | 10/59 | Carter et al. | 260—676 |
| 2,966,451 | 12/60 | Caesar et al. | 260—676 |
| 2,971,824 | 2/61 | Johnson et al. | 23—2.1 X |

MAURICE A. BRINDISI, *Primary Examiner.*